United States Patent Office 3,405,066
Patented Oct. 8, 1968

3,405,066
HIGH THERMAL CONDUCTIVITY FLUID DIELECTRIC
Kenneth B. McGhee, Westport, Conn., and William G. Pitt, White Plains, N.Y., assignors to Union Carbide Corporation, a corporation of New York
No Drawing. Filed Jan. 22, 1965, Ser. No. 430,233
2 Claims. (Cl. 252—63.5)

ABSTRACT OF THE DISCLOSURE

In electrical apparatus having a fluid or solid dielectric material, the addition of an effective amount of boron nitride or silicon dioxide to the dielectric material to maintain the dielectric properties as well as improve the thermal properties of the dielectric materials.

---

This invention relates to the improvement of the heat transfer characteristics of dielectric materials which are used with certain electrical devices and equipment and the subsequent increase in the power capacity of such devices and equipment.

Various dielectric materials are employed as electrical insulators in such apparatus as transformers, capacitors, circuit breakers, switching gear, coils, motors, cables and other electrical equipment. Certain dielectrics are in a fluid form; others are in the form of a solid such as a resin. The conventional materials which are employed as dielectrics in either form are relatively poor heat conductors and are subject to breakdown if they are heated above their decomposition temperature. The fluid dielectrics, such as mineral transformer oils, will polymerize, thicken or produce sludge if they are overheated; the solid insulators, such as paper, resin and cotton fabrics, will decompose or char if they are overheated.

To avoid these adverse effects, it is imperative, therefore, that the heat which is generated within the electrical apparatus due to power loss be kept at a minimum or that the dielectric material be capable of conducting heat effectively. Reducing the power loss heat dissipation is generally an unsatisfactory solution since to accomplish this, the input and output useful power must also be reduced, thereby reducing the effectiveness of the equipment. Restricting the power rating of the equipment is, in addition, of substantial economic significance, particularly with regard to large equipment having a large power capacity such as transformers, motors and the like.

In an effort to overcome these difficulties, several methods to improve heat transfer through the dielectric are used. For example, fluid dielectrics are often circulated by auxiliary equipment in an effort to cool the fluid. Other electrical apparatus depend primarily upon natural convection for an increase in heat dissipation. Many other types of cooling equipment are also used. However, the methods presently employed are generally expensive or relatively ineffective.

It is the principal object of this invention, therefore, to provide an improvement in the heat transfer characteristics of the dielectric materials which are employed in certain electrical equipment.

It is a more specific object of this invention to provide a fluid dielectric material for use in certain electrical apparatus which fluid dielectric material is characterized in that it is electrically non-conductive and highly thermally conductive.

It is a further object of this invention to improve the power capacity of certain electrical equipment such as transformers, capacitors, motors and the like.

Broadly, the objects of the invention are accomplished by including certain essentially non-conducting solid materials having good heat transfer characteristics with the dielectric material which is in contact with the electrical equipment. The thermally conductive materials suitable in the practice of the invention are aluminum oxide, silicon dioxide, magnesium oxide and boron nitride. These materials, in finely divided powdered form, are used as additives and are dispersed in the dielectric materials using conventional mixing techniques and have the effect of substantially increasing the thermal conductivity of the dielectric without reducing its electrical insulating quality. Finely divided materials of the above designated group can be used as an additive with either fluid dielectrics or solid dielectrics. The thermally improved fluid dielectrics are most suitable for use with such equipment as transformers, capacitors, switching gear, cables, motors, generators, circuit breakers and the like, while thermally improved solid dielectrics are most suitable with such equipment as small transformers, motors, generators and capacitors, induction coils and the like.

The term "fluid dielectric" as used herein includes such commonly employed dielectrics as mineral oils, askarels and fluorocarbons. Mineral oils are the preferred fluid dielectric for use in most electrical equipment in view of their relatively low cost and askarels are the preferred dielectric fluids to be used with capacitors and in applications requiring a fire-resistant dielectric. The term "askarels" is the generic term referring to halogenated aromatic compounds used as dielectric fluids and most often relates to chlorinated aromatics. Askarels which are most often employed as fluid dielectrics in electrical equipment are a blend of trichlorobenzene or tetrachlorobenzene and chlorinated diphenyl (usually hexa-hepta chlorinated).

The term "solid dielectric" as used herein generally refers to conventional potting compounds and more particularly, thermosetting resins including epoxies, polyesters and curable phenolics such as melamine resins and aniline resins. Comparative thermal characteristics of the several typical compounds suitable for use in the method of the invention are shown in the following Table 1.

TABLE 1

| Material | Thermal conductivity, B.t.u.-in./ft.$^2$ hr.,° F. | Specific gravity, gm./cc. | Specific heat | Thermal diffusivity, 1.$^2$/t. |
|---|---|---|---|---|
| $Al_2O_3$ | 13–15 | 4.10 | .17–.28 | 10 |
| $SiO_2$ | 10–16 | 2.2 | .17–.28 | 10.5 |
| $MgO$ | 2 | | .27 | 1.3 |
| $BN$ | 90 | 2.0 | .2 | 131 |

Boron nitride has been found to be a desirable compound in the method of the invention. In addition to its electrically insulating properties and its favorable thermal conductivity and diffusivity characteristics, it is inert and will not decompose at the high temperatures which are produced in electrical equipment. The other compounds, while not as effective as the boron nitride, produce important improvements when empolyed with the dielectric material.

In the practice of the invention, the thermally conductive compound may be suspended in a fluid dielectric or may be intermixed with a coating resin, potting compound or other type of solid dielectric. For the most effective and efficient results when combining the dielectric material and the compound, the latter should be in a powdered form having a particle size of from 1 micron to 40 microns with an average size of about 10 microns.

The quantity of the thermally conductive compound, preferably boron nitride, which is added to the dielectric material can vary from 1% to 40% by weight when included with fluid dielectrics and may be employed in even greater amounts when included in potting compounds and resins such as those hereinbefore described. The greater the quantity of boron nitride or equivalent which is added, the greater will be the thermal conductivity of the dielectric. However, practical considerations, such as the adverse effect on the viscosity of fluid dielectric, may limit the quantity to the preferred range hereinbefore indicated for fluid dielectrics, Greater quantities than 40% boron nitride in fluid dielectrics can be used to produce a slurry which can be useful in some applications. By way of example, the use of about 5% finely divided boron nitride in transformer oils will provide an increase of between 6 and 10% in the power rating of a transformer immersed therein as compared to the power rating of the transformer immersed in transformer oil without boron nitride.

The data listed below (Table 2) illustrate that the insulating properties of dielectric materials are virtually unaffected by the addition and dispersion therein of substantial quantities of a thermally conductive compound. Table 2 represents the results of a test which was carried out to determine what effect the addition of boron nitride in varying amounts to transformer mineral oil had on the voltage breakdown level of the dielectric. The test was prepared according to ASTM D-1810 procedures (0.060 inch electrode spacing, sample and room temperature was 68° F. at 25% relative humidity).

TABLE 2

| Mixture tested: | Breakdown, kv. |
|---|---|
| Mineral transformer oil—clear | 20–24 |
| Mineral transformer oil plus 1% boron nitride | 19–20 |
| Mineral transformer oil plus 5% boron nitride | 20–22 |
| Mineral transformer oil plus 10% boron nitride | 18–20 |

The values are well above the acceptable minimum and may be considered to be substantially equivalent within the limits of accuracy and reproducibility of the test.

From the foregoing, it will be appreciated that a dielectric material which, for practical purposes, is thermally non-conductive, will be made thermally conductive by addition and dispersion of certain thermally conductive materials without adversely affecting its dielectric quality, thereby permitting greater useful power to be produced by addition and dispersion of certain thermally conductive tion of the dielectric due to the internal heat or power loss.

What is claimed is:
1. In an electrical apparatus comprising a current carrying component in contact with a fluid dielectric material, the improvement which comprises the addition of at least 1% by weight of thermally conductive electrically nonconductive material selected from the group consisting of boron nitride and silicon dioxide to a fluid dielectric material, said thermally conductive material being composed of particles between 1 micron and 40 microns in size whereby the thermal conductivity of said fluid dielectric material is increased.

2. The combination of a fluid dielectric material for use in electrical equipment and boron nitride in an amount of between 1% and 40% by weight of said fluid dielectric, said boron nitride being composed of particles between 1 micron and 40 microns in size, with an average size of about 10 microns, whereby the thermal conductivity of said fluid dielectric is increased.

References Cited

UNITED STATES PATENTS

| 2,152,536 | 3/1939 | Cooper | 106—193 |
| 2,156,803 | 5/1939 | Cooper et al. | 252—25 |
| 2,550,452 | 3/1951 | Byrne et al. | 252—63.5 X |
| 2,717,839 | 9/1955 | Wright et al. | 252—63.5 |
| 2,887,393 | 5/1959 | Taylor | 106—44 |
| 2,960,466 | 11/1960 | Saunders | 252—25 |
| 2,641,450 | 6/1953 | Garbo | 257—55 |

LEON D. ROSDOL, *Primary Examiner.*

J. D. WELSH, *Assistant Examiner.*